US012461462B2

(12) United States Patent
Fujita et al.

(10) Patent No.: US 12,461,462 B2
(45) Date of Patent: Nov. 4, 2025

(54) WHITE TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Asafumi Fujita, Kanagawa (JP); Teppei Yawada, Kanagawa (JP); Kotaro Yoshihara, Kanagawa (JP); Tsuyoshi Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 918 days.

(21) Appl. No.: 17/586,796

(22) Filed: Jan. 28, 2022

(65) Prior Publication Data

US 2023/0091296 A1 Mar. 23, 2023

(30) Foreign Application Priority Data

Sep. 21, 2021 (JP) ................................ 2021-153561

(51) Int. Cl.

| | |
|---|---|
| ***G03G 9/087*** | (2006.01) |
| ***G03G 9/08*** | (2006.01) |
| ***G03G 9/097*** | (2006.01) |
| ***G03G 15/01*** | (2006.01) |
| ***G03G 15/08*** | (2006.01) |

(52) U.S. Cl.

CPC ....... *G03G 9/08788* (2013.01); *G03G 9/0821* (2013.01); *G03G 9/09708* (2013.01); *G03G 15/0126* (2013.01); *G03G 15/0865* (2013.01)

(58) Field of Classification Search

CPC ............. G03G 9/08788; G03G 9/0821; G03G 9/09708; G03G 15/0126; G03G 15/0865

See application file for complete search history.

(56) References Cited

U.S. PATENT DOCUMENTS

| | | | | |
|---|---|---|---|---|
| 10,409,184 | B2 | 9/2019 | Nakajima et al. | |
| 10,520,841 | B2 | 12/2019 | Sato et al. | |
| 2017/0227872 | A1* | 8/2017 | Kayamori .......... | G03G 9/08755 |
| 2019/0094729 | A1* | 3/2019 | Sakamoto ............ | G03G 9/0902 |
| 2019/0196348 | A1* | 6/2019 | Murakami ........... | G03G 9/0902 |
| 2019/0294063 | A1* | 9/2019 | Sato ................... | G03G 9/08797 |

FOREIGN PATENT DOCUMENTS

| | | |
|---|---|---|
| JP | 2018045225 | 3/2018 |
| JP | 2019168618 | 10/2019 |

OTHER PUBLICATIONS

"Office Action of Japan Counterpart Application", issued on Jul. 29, 2025, with English translation thereof, p. 1-p. 3.

* cited by examiner

*Primary Examiner* — Mark F. Huff
*Assistant Examiner* — Boone Alexander Evans
(74) *Attorney, Agent, or Firm* — JCIPRNET

(57) ABSTRACT

A white toner includes a toner particle that contains a binder resin containing a hybrid resin in which an amorphous resin unit and a crystalline polyester resin unit are chemically bonded to each other, surface-treated titanium oxide, and a release agent, in which a proportion of Al atoms in a surface of the surface-treated titanium oxide is 3 atomic % or greater and 20 atomic % or less, and a proportion of Ti atoms in the surface is 5 atomic % or greater and 15 atomic % or less.

13 Claims, 2 Drawing Sheets

WHITE TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-153561 filed Sep. 21, 2021.

BACKGROUND

(i) Technical Field

The present disclosure relates to a white toner, an electrostatic charge image developer, and a toner cartridge.

(ii) Related Art

JP2018-045225A discloses an electrostatic charge image developing toner that contains acicular titanium oxide having an average aspect ratio of 3 to 30 as a white pigment.

JP2019-168618A discloses an electrostatic charge image developing toner containing a toner particle that contains a binder resin containing a hybrid resin in which an amorphous resin unit other than a polyester resin and a crystalline polyester resin unit are chemically bonded and a vinyl-based resin, and a release agent containing a hydrocarbon-based wax.

SUMMARY

Aspects of non-limiting embodiments of the present disclosure relate to a white toner, an electrostatic charge image developer, and a toner cartridge that is unlikely to accelerate wear of a cleaning blade of an intermediate transfer member as compared with a white toner in which the proportion of Al atoms in a surface of surface-treated titanium oxide is less than 3 atomic % and greater than 20 atomic % or the proportion of Ti atoms in the surface is greater than 15 atomic %.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above-described object includes the following aspects.

According to an aspect of the present disclosure, there is provided a white toner contains a toner particle that contains a binder resin containing a hybrid resin in which an amorphous resin unit and a crystalline polyester resin unit are chemically bonded to each other, surface-treated titanium oxide, and a release agent, in which a proportion of Al atoms in a surface of the surface-treated titanium oxide is 3 atomic % or greater and 20 atomic % or less, and a proportion of Ti atoms in the surface is 5 atomic % or greater and 15 atomic % or less.

BRIEF DESCRIPTION OF THE DRAWINGS

Exemplary embodiment(s) of the present invention will be described in detail based on the following figures, wherein.

DETAILED DESCRIPTION

Figure 1:
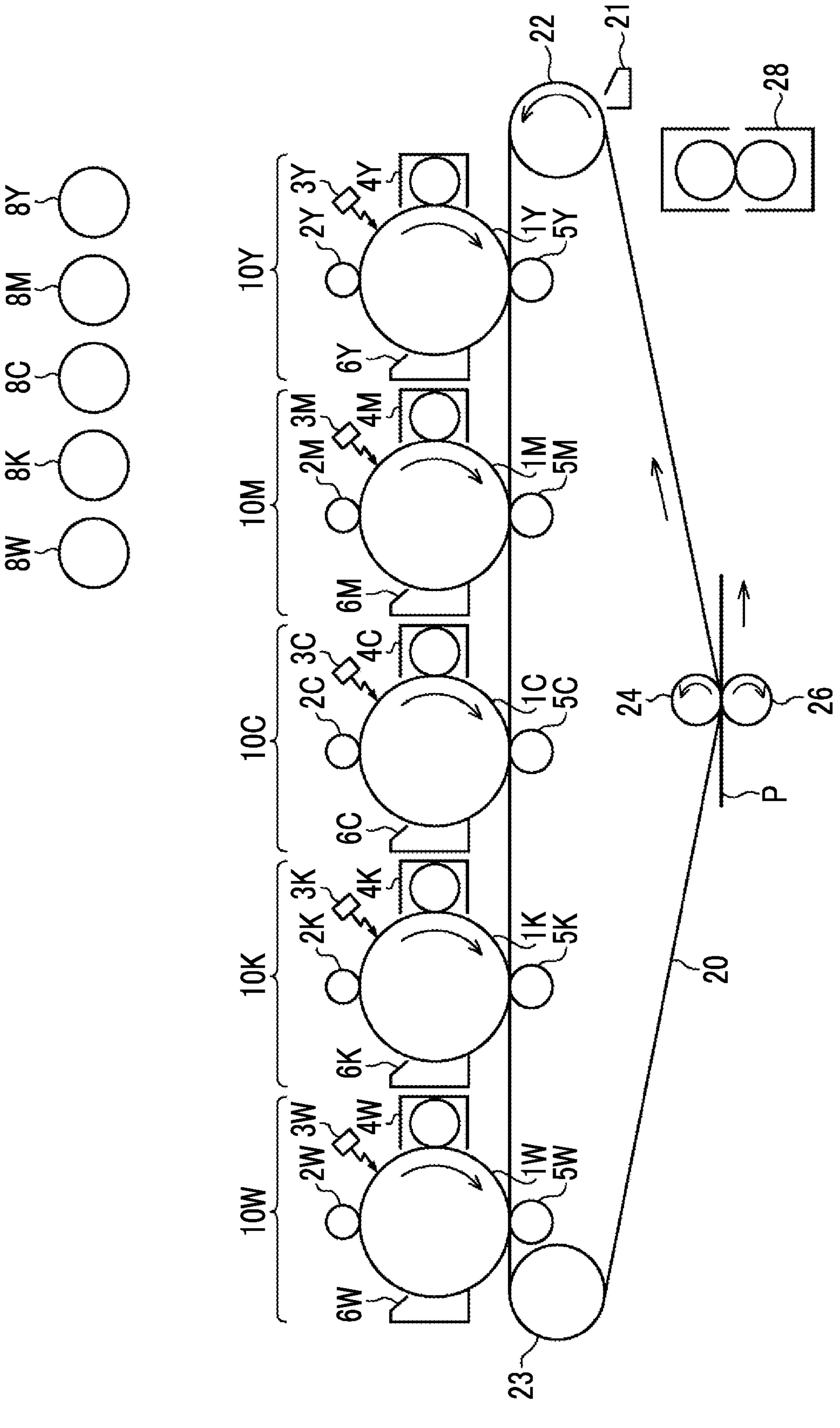
FIG. 1 is a schematic configuration view showing an example of an image forming device according to the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in the numerical range may be replaced with a value shown in an example.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition unless otherwise specified.

In the present disclosure, the term "(meth)acrylic" indicates both acryl and methacryl, and the term "(meth)acrylate" indicates both acrylate and methacrylate.

In the present disclosure, the "electrostatic charge image developing toner" is also referred to as the "toner", the "electrostatic charge image developer" is also referred to as the "developer", and the "electrostatic charge image developing carrier" is also referred to as the "carrier".

In the present disclosure, the "hybrid resin in which an amorphous resin unit and a crystalline polyester resin unit are chemically bonded to each other" is also referred to as the "hybrid resin".

White Toner

A white toner according to the present exemplary embodiment contains a toner particle that contains a binder resin containing a hybrid resin in which an amorphous resin unit and a crystalline polyester resin unit are chemically bonded to each other, surface-treated titanium oxide, and a release agent, in which the proportion of Al atoms in a surface of the surface-treated titanium oxide is 3 atomic % or greater and 20 atomic % or less, and the proportion of Ti atoms in the surface is 5 atomic % or greater and 15 atomic % or less.

The white toner according to the present exemplary embodiment is unlikely to accelerate the wear of a cleaning blade of an intermediate transfer member. The mechanism for this is assumed as follows.

From the viewpoints of the dispersibility in a binder resin and the weather resistance of a white image, titanium oxide which has been widely available as a white pigment of a toner is typically used in the form of being subjected to a surface treatment. However, even surface-treated titanium oxide may be aggregated during the granulation of toner particles depending on the own weight or the degree of affinity depending on the kind of binder resin, and titanium oxide may be unevenly distributed inside the toner particles. The toner particles in which titanium oxide is unevenly distributed have a relatively high dielectric loss rate and a relatively low transfer rate from the intermediate transfer member to the recording medium. Therefore, the toner particles in which titanium oxide is unevenly distributed have a relatively high residual ratio on the intermediate transfer member.

Meanwhile, in a case where the cleaning blade comes into contact with the intermediate transfer member, a phenomenon in which the toner particles remaining on the intermediate transfer member are crushed so that the pigment particles are exposed and thus the cleaning blade is worn out occurs. Since the toner particles in which titanium oxide is unevenly distributed have a relatively high residual ratio on the intermediate transfer member, the wear of the cleaning blade of the intermediate transfer member is accelerated. As a result, toner particles slip through the worn cleaning blade, and thus color stripe occurs in the image.

The above-described phenomenon is significant in a case where white images with a density of 100% are continuously formed on the entire surface of the recording medium (that is, without creating a margin at the edge portions of the recording medium) in a high-temperature and high-humidity environment (for example, a temperature of 28° C. and a relative humidity of 85%) because the residual ratio of the toner particles in which titanium oxide is unevenly distributed on the intermediate transfer member is further increased.

In regard to the above-described phenomenon, the present inventors found that the hybrid resin acts as a dispersant of surface-treated titanium oxide. Further, it was found that the dispersibility of the surface-treated titanium oxide due to the hybrid resin is further enhanced by specifying the atomic composition of the surface of the surface-treated titanium oxide. The mechanism is not necessarily clear, but the balance between the electrostatic repulsive force and the attractive force acting between the hybrid resin and the surface-treated titanium oxide is assumed.

First, the hybrid resin has a crystalline polyester resin unit as a crystalline resin unit from the viewpoint of low-temperature fixability of the toner. Since the hybrid resin has an amorphous resin unit and a crystalline polyester resin unit in a molecule, the hybrid resin tends to be present throughout the toner particles, and thus can be expected to act as a dispersant. Further, it is assumed that the effect of stably dispersing the surface-treated titanium oxide is exhibited because the crystalline polyester resin unit attracts the surface-treated titanium oxide while the amorphous resin unit in a molecule of the hybrid resin repels the surface-treated titanium oxide during the granulation of the toner particles.

In a case where the proportion of Al atoms in the surface of the surface-treated titanium oxide is 3 atomic % or greater and 20 atomic % or less and the proportion of Ti atoms in the surface is 5 atomic % or greater and 15 atomic % or less, the affinity for the hybrid resin is increased.

In a case where the proportion of Al atoms in the surface of the surface-treated titanium oxide is less than 3 atomic %, the affinity of the surface-treated titanium oxide for the molecule of the hybrid resin is low, and thus the titanium oxide is unevenly distributed inside the toner particles. From this viewpoint, the proportion of the Al atoms is, for example, 3 atomic % or greater and preferably 5 atomic % or greater.

In a case where the proportion of Al atoms in the surface of the surface-treated titanium oxide is greater than 20 atomic %, aggregation of the surface-treated titanium oxide is likely to occur. From this viewpoint, the proportion of Al atoms is, for example, 20 atomic % or less and preferably 15 atomic % or less.

In a case where the proportion of Ti atoms in the surface of the surface-treated titanium oxide is greater than 15 atomic %, the affinity of the surface-treated titanium oxide for the molecule of the hybrid resin is low, and thus the titanium oxide is unevenly distributed inside the toner particles. From this viewpoint, the proportion of the Ti atoms is, for example, 15 atomic % or less and preferably 12 atomic % or less.

In a case where the proportion of the Ti atoms in the surface of the surface-treated titanium oxide is less than 5 atomic %, the whiteness and concealability of the white image are insufficient. From this viewpoint, the proportion of Ti atoms is, for example, 5 atomic % or greater and preferably 6 atomic % or greater.

From the above-described viewpoint, for example, the proportion of the Al atoms in the surface of the surface-treated titanium oxide is 5 atomic % or greater and 15 atomic % or less, and the proportion of the Ti atoms in the surface is 6 atomic % or greater and 12 atomic % or less.

From the viewpoint of further improving the dispersibility of the surface-treated titanium oxide due to the hybrid resin, the ratio (Al/Ti) of the atomic weight of Al to the atomic weight Ti in the surface of the surface-treated titanium oxide is, for example, preferably 0.5 or greater and 4.0 or less, more preferably 1.0 or greater and 3.5 or less, and still more preferably 1.5 or greater and 3.0 or less.

The atomic composition of the surface of the surface-treated titanium oxide is acquired by the following measuring method.

In a case where the white toner contains an external additive, the white toner is added to a 5 mass % sodium alkylbenzene sulfonate aqueous solution, and the solution is stirred. Next, ultrasonic waves are applied by a bathtub type ultrasonic disperser to release the external additive from the surface of the toner particle. Thereafter, the toner particles are precipitated by centrifugation, and the supernatant in which the external additive is released and dispersed is removed. The operation from the ultrasonic treatment to the removal of the supernatant is repeated 3 times. Next, the toner particles are suspended in toluene to dissolve the binder resin and the release agent, and the solution is filtered for solid-liquid separation. The solid is sufficiently washed with water and then dried, thereby obtaining powder. The atomic composition of the surface of the particle is acquired by performing mapping at an acceleration voltage of 20 kV and measuring 1000 sites of the surface of the particle using the above-described powder as a sample and using an energy dispersive X-ray analyzer (for example, EMAX model 6923H, manufactured by HORIBA, Ltd.) mounted on a scanning electron microscope (for example, S-4800, manufactured by Hitachi High-Tech Corporation).

From the viewpoint of further improving the dispersibility of the surface-treated titanium oxide due to the hybrid resin, the ratio (hybrid resin/surface-treated titanium oxide) of the mass of the hybrid resin to the mass of the surface-treated titanium oxide contained in the toner particles is, for example, preferably 0.08 or greater and 3.0 or less, more preferably 0.10 or greater and 2.8 or less, and still more preferably 0.12 or greater and 2.6 or less.

Hereinafter, the toner according to the present exemplary embodiment will be described in detail.

The toner according to the present exemplary embodiment contains toner particles and, as necessary, an external additive.

Toner Particles

The toner particles are formed to contain a binder resin containing a hybrid resin, surface-treated titanium oxide, and a release agent, and as necessary, other additives.

Binder Resin

The content of the binder resin is, for example, preferably 40% by mass or greater and 80% by mass or less, more preferably 50% by mass or greater and 75% by mass or less, and still more preferably 60% by mass or greater and 70% by mass or less with respect to the entirety of the toner particles.

It is preferable that the binder resin contains, for example, a hybrid resin and a resin other than the hybrid resin. From the viewpoint of the dispersibility of the surface-treated titanium oxide, the proportion of the hybrid resin in the entirety of the binder resin in terms of mass is, for example, preferably 20% by mass or greater and 70% by mass or less, more preferably 30% by mass or greater and 60% by mass or less, and still more preferably 40% by mass or greater and 50% by mass or less.

Hybrid Resin

From the viewpoint of the dispersibility of the surface-treated titanium oxide, the content of the hybrid resin contained in the toner particles is, for example, preferably 5% by mass or greater and 60% by mass or less, more preferably 10% by mass or greater and 55% by mass or less, and still more preferably 20% by mass or greater and 50% by mass or less with respect to the entirety of the toner particles.

The hybrid resin is a resin in which an amorphous resin unit and a crystalline polyester resin unit are chemically bonded to each other. The amorphous resin unit is a resin portion having a structure derived from an amorphous resin. The crystalline polyester resin unit is a resin portion having a structure derived from a crystalline polyester resin.

The amorphous resin is a resin in which the half-width of the endothermic peak is higher than 10° C., a resin showing a stepwise change in endothermic amount, or a resin in which a clear endothermic peak is not found in a case of measurement at a temperature rising rate of 10° C./min in differential scanning calorimetry.

The crystalline resin is a resin that shows a clear endothermic peak in a case of measurement at a temperature rising rate of 10° C./min in differential scanning calorimetry (specifically, a resin in which the half-width of the endothermic peak is within 10° C.)

From the viewpoint of the low-temperature fixability, the melting temperature or the glass transition temperature of the hybrid resin is, for example, preferably 50° C. or higher and 80° C. or lower. Further, the melting temperature of the hybrid resin is acquired from the DSC curve obtained by differential scanning calorimetry in conformity with the "method of measuring transition temperature of plastics" and "melting peak temperature" in JIS K 7121-1987. Further, the glass transition temperature of the hybrid resin is acquired from the DSC curve obtained by differential scanning calorimetry in conformity with the "method of measuring transition temperature of plastics" and "extrapolated glass transition start temperature" in JIS K 7121-1987.

From the viewpoint of the dispersibility of the surface-treated titanium oxide, the weight-average-molecular weight (Mw) of the hybrid resin is, for example, preferably 5000 or greater and 100000 or less, more preferably 7000 or greater and 50000 or less, and still more preferably 8000 or greater and 20000 or less. Further, the weight-average-molecular weight of the hybrid resin is measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average-molecular weight is calculated using a molecular weight calibration curve created by a monodisperse polystyrene standard sample based on the measurement results.

From the viewpoint of the dispersibility of the surface-treated titanium oxide, the proportion of the amorphous resin unit in the hybrid resin in terms of mass is, for example, preferably 50% by mass or greater and 90% by mass or less, more preferably 60% by mass or greater and 85% by mass or less, and still more preferably 70% by mass or greater and 80% by mass or less.

From the viewpoint of the dispersibility of the surface-treated titanium oxide, the ratio (proportion of amorphous resin unit in terms of mass/proportion of Al atoms) of the proportion (% by mass) of the amorphous resin unit in the hybrid resin in terms of mass to the proportion (atomic %) of the Al atoms in the surface of the surface-treated titanium oxide is, for example, preferably 2.5 or greater and 30 or less, more preferably 2.8 or greater and 28 or less, and still more preferably 3.0 or greater and 25 or less.

Amorphous Resin Unit

The glass transition temperature (Tg) of the amorphous resin forming the amorphous resin unit is, for example, preferably 50° C. or higher and 80° C. or lower. The glass transition temperature of the hybrid resin is acquired from the DSC curve obtained by differential scanning calorimetry in conformity with the "method of measuring transition temperature of plastics" and "extrapolated glass transition start temperature" in JIS K 7121-1987.

As the amorphous resin forming the amorphous resin unit, a commercially available product or a synthetic product may be used. Examples of the amorphous resin forming the amorphous resin unit include known amorphous vinyl-based resins (such as a polystyrene resin or a styrene (meth)acrylic resin), an epoxy resin, a polycarbonate resin, a polyurethane resin, and an amorphous polyester resin.

As the amorphous resin forming the amorphous resin unit, from the viewpoint of the low-temperature fixability of the toner, for example, at least one selected from the group consisting of a polystyrene resin, a styrene (meth)acrylic resin, and a polyurethane resin is preferable, and a combination of a polystyrene resin or a styrene (meth)acrylic resin and a polyurethane resin is more preferable.

Examples of the polystyrene resin include a homopolymer or a copolymer of styrene or styrene derivatives. Examples of the styrene derivatives include alkyl-substituted styrene such as α-methylstyrene, 4-methylstyrene, 2-methylstyrene, 3-methylstyrene, 2-ethylstyrene, 3-ethylstyrene, and 4-ethylstyrene, halogen-substituted styrene such as 2-chlorostyrene, 3-chlorostyrene, and 4-chlorostyrene, fluorine-substituted styrene such as 4-fluorostyrene and 2,5-difluorostyrene, and vinylnaphthalene.

Examples of the styrene (meth)acrylic resin include a resin obtained by copolymerizing styrene or a styrene derivative and a (meth)acrylic acid or a (meth)acrylic acid ester at a polymerization ratio (in terms of mass, former: latter) of 85:15 to 70:30.

The styrene derivative is, for example, the above-described monomer. Examples of the (meth)acrylic acid ester include (meth)acrylic acid alkyl ester (such as n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth) acrylate, n-lauryl (meth) acrylate, n-tetradecyl (meth) acrylate, n-hexadecyl (meth) acrylate, n-octadecyl (meth) acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth) acrylate, isoheptyl (meth)acrylate, isooctyl (meth) acrylate, 2-ethylhexyl (meth) acrylate, cyclohexyl (meth) acrylate, or t-butylcyclohexyl (meth)acrylate), (meth)acrylic acid aryl ester (such as phenyl (meth)acrylate, biphenyl (meth)acrylate, diphenylethyl (meth)acrylate, t-butylphenyl (meth) acrylate, or terphenyl (meth)acrylate), dimethylaminoethyl (meth) acrylate, diethylaminoethyl (meth) acrylate, methoxyethyl (meth) acrylate, 2-hydroxyethyl (meth)acrylate, β-carboxyethyl (meth)acrylate, and (meth) acrylamide.

Examples of the polyurethane resin includes a polyurethane resin obtained by the reaction between a resin containing a hydroxy group (at least one selected from the group consisting of a polyvinyl acetal resin, a polyvinyl resin, casein, and a phenol resin) and an isocyanate compound (an aromatic polyisocyanate, an aliphatic polyisocyanate, or an alicyclic polyisocyanate). The isocyanate compound may be a blocked isocyanate compound (a compound in which an isocyanate group is protected by a blocking agent).

Crystalline Polyester Resin Unit

The melting temperature of the crystalline polyester resin forming the crystalline polyester resin unit is, for example, preferably 50° C. or higher and 100° C. or lower, more preferably 55° C. or higher and 90° C. or lower, and still more preferably 60° C. or higher and 85° C. or lower. The melting temperature is acquired from the DSC curve obtained by differential scanning calorimetry in conformity with the "method of measuring transition temperature of plastics" and "melting peak temperature" in JIS K 7121-1987.

As the crystalline polyester resin forming the crystalline polyester resin unit, a commercially available product or a synthetic product may be used. Examples of the crystalline polyester resin forming the crystalline polyester resin unit include a polycondensate of a polyvalent carboxylic acid and a polyhydric alcohol.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-dicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of such dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the examples, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

From the viewpoint of the low-temperature fixability of the toner, for example, a crystalline aliphatic polyester resin obtained from a polyvalent carboxylic acid component and a polyhydric alcohol component is preferable as the crystalline polyester resin forming the crystalline polyester resin unit.

Examples of the polyvalent carboxylic acid component in the crystalline aliphatic polyester resin includes an aliphatic dicarboxylic acid such as oxalic acid, malonic acid, maleic acid, fumaric acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid. Among the examples, for example, a polyvalent carboxylic acid component having 8 or more and 22 or less carbon atoms is preferable.

Examples of the polyhydric alcohol component in the crystalline aliphatic polyester resin include 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanedecanediol. Among the examples, for example, a polyhydric alcohol component having 4 or more and 10 or less carbon atoms is preferable.

The total number of carbon atoms of the polyvalent carboxylic acid component and carbon atoms of the polyhydric alcohol component in the crystalline aliphatic polyester resin is, for example, preferably 8 or greater and 22 or less, more preferably 10 or greater and 20 or less, and still more preferably 12 or greater and 18 or less. The number of carbon atoms of the polyvalent carboxylic acid component is the total number of carbon atoms including carbons of the carboxy group. In a case where the crystalline aliphatic polyester resin is formed by using a plurality of polyvalent carboxylic acid components, the value weighted and averaged by the molar ratio of each polyvalent carboxylic acid component is defined as the number of carbon atoms of the polyvalent carboxylic acid component. In a case where the crystalline aliphatic polyester resin is formed by using a plurality of polyhydric alcohol components, the value weighted and averaged by the molar ratio of each polyhydric alcohol component is defined as the number of carbon atoms of the polyhydric alcohol component.

Method of Synthesizing Hybrid Resin

Examples of the method of synthesizing the hybrid resin include the following (1), (2) and (3).

(1) Method of Forming Amorphous Resin Unit in Presence of Crystalline Polyester Resin Formed in Advance and Synthesizing Hybrid Resin A crystalline polyester resin unit is formed by polycondensing a polyvalent carboxylic acid and a polyhydric alcohol. Next, an amorphous resin unit is formed by polymerizing the monomers constituting an amorphous resin unit in the presence of the crystalline polyester resin unit. Here, a monomer capable of reacting with the carboxy group or the hydroxy group in the crystalline polyester resin unit is allowed to coexist, and the amorphous resin unit is bonded to the crystalline polyester resin unit.

(2) Method of Polycondensing Crystalline Polyester Resin Unit in Presence of Amorphous Resin Unit Formed in Advance and Synthesizing Hybrid Resin An amorphous resin unit is formed by polymerizing the monomers constituting an amorphous resin unit. Here, for example, it is preferable that a monomer capable of reacting with the carboxy group or the hydroxy group in the crystalline polyester resin unit is also polymerized. Next, in the presence of the amorphous resin unit, the polyvalent carboxylic acid and the polyhydric alcohol are polycondensed to form a crystalline polyester resin unit. During the polycondensation of the polyvalent carboxylic acid and the polyhydric alcohol, the carboxy group of the polyvalent carboxylic acid or the hydroxy group of the polyhydric alcohol is subjected to an addition reaction to the amorphous resin unit.

(3) Method of Bonding Amorphous Resin Unit Formed in Advance and Crystalline Polyester Resin Unit and Synthesizing Hybrid Resin An amorphous resin unit is formed by polymerizing the monomers constituting an amorphous resin unit. Here, for example, it is preferable that a monomer capable of reacting with the carboxy group or the hydroxy group in the crystalline polyester resin unit is also polymerized. Separately, the crystalline polyester resin unit is formed by polycondensing the polyvalent carboxylic acid and the polyhydric alcohol. Next, the amorphous resin unit and the crystalline polyester resin unit are allowed to react and bonded to each other. In a case where the amorphous resin unit reacts with the crystalline polyester resin unit, a compound capable of being bonded to both units may coexist so that both units are bonded to each other.

Other Binder Resins

Examples of the binder resin other than the hybrid resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

The binder resins may be used alone or in combination of two or more kinds thereof.

As the binder resin other than the hybrid resin, for example, a vinyl-based resin is preferable. The vinyl-based resin may be a homopolymer or a copolymer.

Examples of the vinyl-based resin include homopolymers of monomers such as monomers having a styrene skeleton (for example, styrene, parachlorostyrene, and α-methylstyrene), monomers having a (meth)acrylic acid ester skeleton (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), monomers having an ethylenically unsaturated nitrile skeleton (for example, acrylonitrile and methacronitrile), monomers having a vinyl ether skeleton (for example, vinyl methyl ether and vinyl isobutyl ether), monomers having a vinyl ketone skeleton (for example, vinyl methyl ketone, vinyl ethyl ketone, and vinyl isopropenyl ketone), and monomers having an olefin skeleton (for example, ethylene, propylene, and butadiene) or copolymers obtained by combining two or more kinds of such monomers.

From the viewpoint of the low-temperature fixability of the toner, for example, it is preferable that the vinyl-based resin is a styrene (meth)acrylic resin obtained by copolymerizing a monomer having a styrene skeleton and a monomer having a (meth)acrylic acid ester skeleton.

Examples of the monomer having a styrene skeleton include styrene, alkyl-substituted styrene (such as α-methylstyrene, 2-methylstyrene, 3-methylstyrene, 4-methylstyrene, 2-ethylstyrene, 3-ethylstyrene, or 4-ethylstyrene), halogen-substituted styrene (such as 2-chlorostyrene, 3-chlorostyrene, or 4-chlorostyrene), and vinylnaphthalene. The monomer having a styrene skeleton may be used alone or in combination of two or more kinds thereof. From the viewpoints of ease of reaction and ease of control of the reaction, for example, styrene is preferable as the monomer having a styrene skeleton.

Examples of the monomer having a (meth)acrylic acid ester skeleton include (meth)acrylic acid and (meth)acrylic acid ester. Examples of the (meth)acrylic acid ester include (meth)acrylic acid alkyl ester (such as n-methyl (meth) acrylate, n-ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth) acrylate, n-tetradecyl (meth) acrylate, n-hexadecyl (meth) acrylate, n-octadecyl (meth) acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth) acrylate, 2-ethylhexyl (meth) acrylate, cyclohexyl (meth) acrylate, or t-butylcyclohexyl (meth)acrylate), (meth)acrylic acid aryl ester (such as phenyl (meth)acrylate, biphenyl (meth)acrylate, diphenylethyl (meth)acrylate, t-butylphenyl (meth)acrylate, or terphenyl (meth)acrylate), dimethylaminoethyl (meth) acrylate, diethylaminoethyl (meth) acrylate, methoxyethyl (meth) acrylate, 2-hydroxyethyl (meth)acrylate, β-carboxyethyl (meth)acrylate, and (meth)acrylamide. The (meth) acrylic acid-based monomer may be used alone or in combination of two or more kinds thereof.

The copolymerization ratio (in terms of mass, former: latter) of the monomer having a styrene skeleton to the monomer having a (meth)acrylic acid ester skeleton is, for example, preferably in a range of 85:15 to 70:30.

From the viewpoint of suppressing blocking, it is preferable that the styrene (meth)acrylic resin has, for example, a crosslinked structure. Examples of the styrene (meth)acrylic resin having a crosslinked structure include a crosslinked product crosslinked by copolymerizing a monomer having a styrene skeleton, a monomer having a (meth)acrylic acid skeleton, and a crosslinkable monomer. The proportion of the crosslinkable monomer in all monomers of the styrene (meth)acrylic resin in terms of mass is, for example, preferably 0.2% by mass or greater and 3% by mass or less.

Examples of the crosslinkable monomer introduced to the styrene (meth)acrylic resin include a bifunctional or higher functional crosslinking agent. Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, or glycidyl (meth)acrylate), polyester-type di(meth)acrylate, and 2-([1'-methylpropylideneamino]carboxyamino)ethyl methacrylate. Examples of the polyfunctional crosslinking agent include a tri(meth) acrylate compound (such as pentaerythritol tri(meth)acrylate, trimethylolethanetri(meth)acrylate, or trimethylolpropane tri(meth)acrylate), a tetra(meth)acrylate compound (such as tetramethylolmethane tetra(meth)acrylate or oligoester (meth)acrylate), 2,2-bis(4-methacryloxy polyethoxyphenyl)propane, diallyl phthalate, triallyl cyanurate, triallylisocyanurate, triallyl isocyanurate, triallyl trimellitate, and diallyl chlorendate.

The weight-average-molecular weight (Mw) of the styrene (meth)acrylic resin is, for example, preferably 30000 or greater and 200000 or less, more preferably 40000 or greater and 100000 or less, and still more preferably 50000 or greater and 80000 or less. Further, the weight-average-molecular weight of the styrene (meth)acrylic resin is measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average-molecular weight is calculated using a molecular weight calibration curve created by a monodisperse polystyrene standard sample based on the measurement results.

Surface-Treated Titanium Oxide

The surface-treated titanium oxide is a pigment that imparts whiteness to the toner and is titanium oxide in which titanium oxide is surface-treated with at least one of an inorganic compound or an organic compound. Titanium oxide and surface-treated titanium oxide are in the particle form.

The crystal structure of titanium oxide ($TiO_2$) constituting surface-treated titanium oxide may be anatase, rutile, brookite, a mixed crystal structure thereof, or an amorphous structure thereof.

Examples of a method of producing titanium oxide include a chlorine method (gas phase method), a sulfuric acid method (liquid phase method), a sol-gel method using titanium alkoxide, and a method of firing metatitanic acid.

An example of the chlorine method (gas phase method) is as follows. Rutile ore that is a raw material is allowed to react with coke and chlorine to form gaseous titanium tetrachloride and cooled, thereby obtaining liquid titanium tetrachloride. Next, gaseous or steamy titanium tetrachloride is allowed to react with oxygen gas at a high temperature to separate chlorine gas, thereby obtaining titanium oxide.

From the viewpoints of the dispersibility in the binder resin and the weather resistance of a white image, the surface treatment method and the surface treatment agent for titanium oxide may be selected from known methods or known treatment agents. The surface treatment method for titanium oxide is largely classified into wet a treatment and a dry treatment.

The wet treatment is a treatment method of adding a surface treatment agent to a slurry in which titanium oxide is dispersed in an aqueous solvent or an organic solvent and coating the surface of titanium oxide.

The dry treatment is a treatment method of applying steam or gas of a surface treatment agent to flowing titanium oxide and coating the surface of the titanium oxide.

Examples of the surface treatment agent for titanium oxide include a metal oxide containing Al, a metal oxide containing Si, a metal oxide containing Zr, fatty acids, and silicone.

From the viewpoint of the dispersibility in the binder resin, for example, it is preferable that the surface-treated titanium oxide is titanium oxide coated with alumina ($Al_2O_3$) The titanium oxide coated with alumina may have other chemicals (such as silica, zirconia, fatty acids, silicone) disposed between the alumina and the titanium oxide and, for example, it is preferable that the alumina is on the outermost surface. In the present disclosure, the "coating" indicates attachment to at least a part of the surface of an object.

From the viewpoint of suppressing aggregating of the surface-treated titanium oxide, the average major axis length of the surface-treated titanium oxide is, for example, preferably 20 nm or greater, more preferably 30 nm or greater, and still more preferably 40 nm or greater.

From the viewpoint of suppressing the wear of the cleaning blade of the intermediate transfer member, the average major axis length of the surface-treated titanium oxide is, for example, preferably 300 nm or less, more preferably 250 nm or less, and still more preferably 220 nm or less.

From the viewpoint of interacting with the hybrid resin and improving the dispersibility, the BET specific surface area of the surface-treated titanium oxide is, for example, preferably 4 $m^2/g$ or greater and more preferably 6 $m^2/g$ or greater.

From the viewpoint of excellent whiteness, the BET specific surface area of the surface-treated titanium oxide is, for example, preferably 12 $m^2/g$ or less and more preferably 10 $m^2/g$ or less.

The average major axis length and the BET specific surface area of the surface-treated titanium oxide are acquired by the following measuring method.

In a case where the white toner contains an external additive, the white toner is added to a 5 mass % sodium alkylbenzene sulfonate aqueous solution, and the solution is stirred. Next, ultrasonic waves are applied by a bathtub type ultrasonic disperser to release the external additive from the surface of the toner particle. Thereafter, the toner particles are precipitated by centrifugation, and the supernatant in which the external additive is released and dispersed is removed. The operation from the ultrasonic treatment to the removal of the supernatant is repeated 3 times. Next, the toner particles are suspended in toluene to dissolve the binder resin and the release agent, and the solution is filtered for solid-liquid separation. The solid is sufficiently washed with water and then dried, thereby obtaining powder. The powder is used as a measurement sample for each of the average major axis length and the BET specific surface area.

The average major axis length is a value obtained by imaging the sample with a scanning electron microscope (for example, S-4700, manufactured by Hitachi High-Tech Corporation) at a magnification of 10000 times, measuring the major axis lengths of 100 particles using an image processing analyzer (for example, LUZEX, manufactured by), and arithmetically averaging the values.

The BET specific surface area is a value measured by precisely weighing 1 g of the sample according to a BET multipoint method using nitrogen gas with a BET specific surface area meter (for example, SA3100, manufactured by Beckman Coulter KK).

The toner particles may contain white pigments other than the surface-treated titanium oxide. Examples of other white pigments include zinc oxide, silicon dioxide, alumina, calcium carbonate, aluminum hydroxide, satin white, talc, calcium sulfate, magnesium oxide, magnesium carbonate, white carbon, kaolin, an aluminosilicate, sericite, bentonite, and smectite. Such white pigments may be used alone or in combination of two or more kinds thereof. Such white pigments may be added to the toner particles for applications other than coloration (for example, applications such as control of charging the toner).

The content of the surface-treated titanium oxide contained in the toner particles is, for example, preferably 85% by mass or greater and 100% by mass or less, more preferably 90% by mass or greater and 100% by mass or less, and still more preferably 95% by mass or greater and 100% by mass or less with respect to the total amount of the white pigment contained in the toner particles.

From the viewpoints of whiteness and concealability, the content of the surface-treated titanium oxide contained in the toner particles is, for example, preferably 20% by mass or greater and 60% by mass or less, more preferably 25% by mass or greater and 55% by mass or less, and still more preferably 30% by mass or greater and 50% by mass or less with respect to the entirety of the toner particles.

Release Agent

Examples of the release agent include hydrocarbon-based wax, natural wax such as carnauba wax, rice wax, or candelilla wax, synthetic or mineral/petroleum-based wax such as montan wax; and ester wax such as fatty acid ester or montanic acid ester. The release agent is not limited thereto.

The melting temperature of the release agent is, for example, preferably 50° C. or higher and 110° C. or lower and more preferably 60° C. or higher and 100° C. or lower. The melting temperature of the release agent is acquired from the DSC curve obtained by differential scanning calorimetry in conformity with the "method of measuring transition temperature of plastics" and "melting peak temperature" in JIS K 7121-1987.

The content of the release agent is, for example, preferably 1% by mass or greater and 20% by mass or less and more preferably 5% by mass or greater and 15% by mass or less with respect to the entirety of the toner particles.

Other Additives

Examples of other additives include known additives such as a magnetic material, a charge control agent, and inorganic powder. The additives are contained in the toner particles as internal additives.

Characteristics of Toner Particles and the Like

The toner particles may be toner particles having a single layer structure or toner particles having a so-called core-shell structure formed of a core portion (core particle) and a coating layer (shell layer) covering the core portion. The toner particles having a core-shell structure may be formed of, for example, a core portion containing a binder resin, a release agent, and surface-treated titanium oxide and a coating layer containing the binder resin.

The volume average particle diameter (D50v) of the toner particles is, for example, preferably 2 μm or greater and 10 μm or less and more preferably 4 μm or greater and 8 μm or less.

Various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5 mass % aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. The number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter). It is obtained by [(perimeter of a circle having the same projection area as the particle image)/(perimeter of the projected particle image)]. Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

In a case where the toner has an external additive, the toner (developer) to be measured is dispersed in water containing a surfactant, and an ultrasonic treatment is performed, thereby obtaining toner particles from which the external additive has been removed.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. The hydrophobic treatment agent may be used alone or in combination of two or more kinds thereof.

The amount of the hydrophobic treatment agent is, for example, typically 1 part by mass or greater and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of the external additive to be externally added is, for example, preferably 0.01% by mass or greater and 5% by mass or less and more preferably 0.01% by mass or greater and 2.0% by mass or less with respect to the entirety of the toner particles.

Method of Producing White Toner

The white toner according to the present exemplary embodiment can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The production method is not particularly limited, and a known production method is employed. Among the examples, the toner particles may be obtained by, for example, the aggregation and coalescence method.

Hereinafter, an aggregation and coalescence method will be described using toner particles containing a binder resin that contains a hybrid resin and a vinyl-based resin as an example. The aggregation and coalescence method in this case includes, for example, a step of preparing a hybrid resin particle dispersion liquid in which hybrid resin particles are dispersed, a step of preparing a vinyl-based resin particle dispersion liquid in which vinyl-based resin particles are dispersed, a step of preparing a surface-treated titanium oxide dispersion liquid in which surface-treated titanium oxide is dispersed, a step of preparing a release agent particle dispersion liquid in which release agent particles are dispersed, a step of aggregating mixed particles in a mixed dispersion liquid obtained by mixing the hybrid resin particle dispersion liquid, the vinyl-based resin particle dispersion liquid, the surface-treated titanium oxide dispersion liquid, and the release agent particle dispersion liquid to form aggregated particles (aggregated particle formation step), and a step of heating the aggregated particle dispersion liquid in which the aggregated particles are dispersed and fusing and coalescing the aggregated particles to form toner particles (fusion and coalescence step).

Dispersion Liquid Preparation Step

The hybrid resin particle dispersion liquid and the vinyl-based resin particle dispersion liquid can be prepared by the same method. Hereinafter, such dispersion liquids will be collectively described as the resin particle dispersion liquid.

The resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Depending on the kind of resin particles, the resin particles may be dispersed in a dispersion medium by a phase inversion emulsification method. The phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing phase inversion from W/O to O/W, and dispersing the resin in the aqueous medium in the particle form.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less. The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

Similar to the resin particle dispersion liquid, a surface-treated titanium oxide dispersion liquid and a release agent particle dispersion liquid are also prepared. The same applies to the surface-treated titanium oxide to be dispersed in the surface-treated titanium oxide dispersion liquid and the release agent particles to be dispersed in the release agent particle dispersion liquid in terms of the volume average particle diameter of particles in the resin particle dispersion liquid, the dispersion medium, the dispersion method, and the content of the particles.

Aggregated Particle Formation Step

Next, the resin particle dispersion liquid, the surface-treated titanium oxide dispersion liquid, and the release agent particle dispersion liquid are mixed. Further, the resin particles, the surface-treated titanium oxide, and the release agent particles are heteroaggregated in the mixed dispersion liquid to form aggregated particles including the resin particles, the surface-treated titanium oxide, and the release agent particles, which have a diameter close to the diameter of the target toner particles.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to a temperature close to the glass transition temperature of the resin particles (specifically, for example, a temperature higher than or equal to the glass transition temperature of the resin particles—30° C. and lower than or equal to the glass transition temperature thereof—10° C.) and allowing the particles to be dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant contained in the mixed dispersion liquid, an inorganic metal salt, and a divalent or higher valent metal complex. In a case where a metal complex is used as the aggregating agent, the amount of the surfactant to be used is reduced, and the charging characteristics are improved.

In addition to the aggregating agent, an additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent to be added is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

The aggregated particle dispersion liquid in which the aggregated particles are dispersed is heated to a temperature higher than or equal to the glass transition temperature of the resin particles (for example, a temperature higher than the glass transition temperature of the resin particles by 10° C. to 30° C.) and the aggregated particles are fused and coalesced, thereby forming toner particles.

The toner particles are obtained by performing the above-described steps.

Further, the toner particles may be produced by performing a step of obtaining the aggregated particle dispersion liquid in which the aggregated particles are dispersed, further mixing the aggregated particle dispersion liquid with the vinyl-based resin particle dispersion liquid, and allowing the vinyl-based resin particles to be aggregated such that the resin particles are further attached to the surface of each aggregated particle to form second aggregated particles and a step of heating the second aggregated particle dispersion liquid in which the second aggregated particles are dispersed and fusing and coalescing the second aggregated particle to form toner particles having a core-shell structure.

After completion of the fusion and coalescence step, toner particles in a dry state are obtained by performing a known cleaning step, a known solid-liquid separation step, and a known drying step on the toner particles in the dispersion liquid. From the viewpoint of the charging properties, for example, displacement cleaning may be sufficiently performed as the cleaning step using ion exchange water. From the viewpoint of the productivity, for example, suction filtration, pressure filtration, or the like may be performed as the solid-liquid separation step. From the viewpoint of the productivity, for example, freeze-drying, flush drying, fluidized drying, vibratory fluidized drying, or the like may be performed as the drying step.

The toner according to the present exemplary embodiment is produced, for example, by adding an external additive to the obtained toner particles in a dry state and mixing the external additive with the toner particles. The mixing may be performed, for example, using a V blender, a Henschel mixer, a Lodige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the white toner according to the present exemplary embodiment.

The electrostatic charge image developer according to the present exemplary embodiment may be a one-component developer which contains only the white toner according to the present exemplary embodiment or a two-component developer obtained by mixing the white toner and a carrier.

The carrier is not particularly limited, and examples thereof include known carriers. Examples of the carrier include a coated carrier obtained by coating the surface of a core material consisting of magnetic powder with a resin, a magnetic powder dispersion type carrier obtained by dispersing magnetic powder in a matrix resin so as to be blended, and a resin impregnation type carrier obtained by impregnating porous magnetic powder with a resin. Each of the magnetic powder dispersion type carrier and the resin impregnation type carrier may be a carrier obtained by coating the surface of a core material, which is particles configuring the carrier, with a resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin. The coating resin and the matrix resin may contain additives such as conductive particles. Examples of the conductive particles include metals such as gold, silver, and copper, and particles such as carbon black, titanium oxide, zinc oxide, tin oxide, barium sulfate, aluminum borate, and potassium titanate.

Examples of a method of coating the surface of the core material with a resin include a method of coating the surface with a solution for forming a coating layer which is obtained by dissolving the coating resin and various additives (used as necessary) in an appropriate solvent. The solvent is not particularly limited, and may be selected in consideration of the kind of the resin to be used, coating suitability, and the like. Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

An image forming device according to the present exemplary embodiment includes an image holding member, a charging unit that charges the surface of the image holding member, an electrostatic charge image forming unit that forms an electrostatic charge image on the charged surface of the image holding member, a developing unit that accommodates an electrostatic charge image developer and develops the electrostatic charge image formed on the surface of the image holding member as a toner image using the electrostatic charge image developer, an intermediate transfer member to which the toner image formed on the surface of the image holding member is transferred, a primary transfer unit that transfers the toner image formed on the surface of the image holding member to the surface of the intermediate transfer member, a secondary transfer unit that transfers the toner image transferred to the surface of the intermediate transfer member to the surface of a recording medium, a fixing unit that fixes the toner image transferred to the surface of the recording medium, and an intermediate transfer member cleaning unit that cleans the toner remaining on the surface of the intermediate transfer member using the blade after the toner image is transferred to the surface of the recording medium. Further, the electrostatic charge image developer according to the present exemplary embodiment is applied as the electrostatic charge image developer.

In the image forming device according to the present exemplary embodiment, an image forming method (the image forming method according to the present exemplary embodiment) including a charging step of charging the surface of the image holding member, an electrostatic charge image forming step of forming an electrostatic charge image on the charged surface of the image holding member, a developing step of developing the electrostatic charge image formed on the surface of the image holding member as a toner image using the electrostatic charge image developer according to the present exemplary embodiment, a primary transfer step of transferring the toner image formed on the surface of the image holding member to the surface of the intermediate transfer member, a secondary transfer step of transferring the toner image transferred to the surface of the intermediate transfer member to the surface of the recording medium, a fixing step of fixing the toner image transferred to the surface of the recording medium, and an intermediate transfer member cleaning step of cleaning the toner remaining the surface of the intermediate transfer member by bringing the blade into contact with the surface of the intermediate transfer member after the toner image is transferred to the surface of the recording medium is performed.

As the image forming device according to the present exemplary embodiment, a known image forming device such as a device including a cleaning unit that cleans the surface of an image holding member after transfer of a toner image and before charge of the image holding member or a device including an electricity removing unit removing electricity by irradiating a surface of an image holding member with electricity removing light after transfer of a toner image and before charge of the image holding member is applied.

In the image forming device according to the present exemplary embodiment, for example, the portion including the developing unit may have a cartridge structure (process cartridge) that is detachably attached to the image forming device. For example, a process cartridge including a developing unit that accommodates the electrostatic charge image developer according to the present exemplary embodiment is preferably used as the process cartridge.

The image forming device according to the present exemplary embodiment may be an image forming device that further uses at least one selected from a yellow toner, a magenta toner, a cyan toner, and a black toner in addition to the white toner according to the present exemplary embodiment.

Hereinafter, an example of the image forming device according to the present exemplary embodiment will be described, but the present exemplary embodiment is not limited thereto. In the description below, main parts shown in the figures will be described, but description of other parts will not be provided.

FIG. 1 is a schematic configuration view showing an image forming device according to the present exemplary embodiment and is a view showing an image forming device having a 5-series tandem system and an intermediate transfer system.

The image forming device shown in FIG. 1 includes first to fifth image forming units 10Y, 10M, 10C, 10K, and 10W (image forming units) having an electrophotographic system of outputting images of each color of yellow (Y), magenta (M), cyan (C), black (K), and white (W) based on color-separated image data. The image forming units (hereinafter, also simply referred to as "units") 10Y, 10M, 10C, 10K, and 10W are arranged in parallel at predetermined intervals in the horizontal direction. The units 10Y, 10M, 10C, 10K, and 10W may be process cartridges that are detachable from the image forming device.

Below the units 10Y, 10M, 10C, 10K, and 10W, an intermediate transfer belt 20 (an example of the intermediate transfer member) extends across each of the units. An intermediate transfer belt 20 is provided by winding around a drive roll 22, a support roll 23, and an opposing roll 24 that are in contact with the inner surface of the intermediate transfer belt 20 and is designed to travel in a direction from the first unit 10Y to the fifth unit 10W. An intermediate transfer member cleaning device (an example of the intermediate transfer member cleaning unit) 21 is provided to face the drive roll 22 on an image holding surface side of the intermediate transfer belt 20.

The intermediate transfer belt 20 is, for example, a laminate of a base material layer and a surface layer disposed on an outer peripheral surface of a base material layer. The base material layer contains, for example, a resin such as a polyimide resin, a polyamide resin, a polyamide-imide resin, a polyether ester resin, a polyarylate resin, or a polyester resin, and a conductive agent. The surface layer contains, for example, at least one of the above-described resins, a fluororesin, and a conductive agent. The thickness of the intermediate transfer belt 20 is, for example, 50 μm or greater and 100 μm or less.

Each of yellow toner, magenta toner, cyan toner, black toner, and white toner stored in toner cartridges 8Y, 8M, 8C, 8K, and 8W is supplied to each of developing devices (an example of developing units) 4Y, 4M, 4C, 4K, and 4W of the units 10Y, 10M, 10C, 10K, and 10W.

Since the first to fifth units 10Y, 10M, 10C, 10K, 10W have the identical configurations, operations, and functions, the first unit 10Y that forms a yellow image disposed on the upstream side in the traveling direction of the intermediate transfer belt will be described as a representative example.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3Y that exposes the charged surface to a laser beam based on a color-separated image signal to form an electrostatic charge image, a developing device (an example of a developing unit) 4Y that supplies the toner to the electrostatic charge image to develop the electrostatic charge image, a primary transfer roll 5Y (an example of the primary transfer unit) that transfers the developed toner image onto the intermediate transfer belt 20, and a photoreceptor cleaning device (an example of the image holding member cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, 5K, and 5W of the units. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam, the specific resistance of the portion irradiated with the laser beam changes. Therefore, the exposure device 3Y irradiates the surface of the charged photoreceptor 1Y with the laser beam based on yellow image data sent from a control unit (not shown). In this manner, an electrostatic charge image in a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam is decreased by the exposure device 3Y, the charged electric charge on the surface of the photoreceptor 1Y flows, and the electric charge in a portion that has not been irradiated with the laser beam remains.

The electrostatic charge image formed on the photoreceptor 1Y rotates to a predetermined development position according to the traveling of the photoreceptor 1Y. Further, the electrostatic charge image on the photoreceptor 1Y is developed and visualized at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has a charge having the same polarity (negative polarity) as the charged electric charge on the photoreceptor 1Y, and is held on a developer roll (an example of the developer holding member). Further, as the surface of the photoreceptor 1Y passes through the developing device 4Y, the yellow toner is electrostatically attached to the statically eliminated latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, +10 μA by a control unit (not shown) in the first unit 10Y.

After transferring the toner image to the intermediate transfer belt 20, the photoreceptor 1Y continues to rotate and comes into contact with the cleaning blade included in the photoreceptor cleaning device 6Y. Further, the toner remaining on the photoreceptor 1Y is removed by the photoreceptor cleaning device 6Y and recovered.

The primary transfer bias applied to the primary transfer rolls 5M, 5C, 5K, and 5W of the second to fifth units 10M, 10C, 10K, and 10W is also controlled according to the first unit.

In this manner, the intermediate transfer belt 20 to which the yellow toner image is transferred by the first unit 10Y is sequentially transported through the second to fifth units 10M, 10C, 10K, and 10W, and the toner images of each color are superimposed and multiple-transferred.

The intermediate transfer belt 20, to which the toner images of five colors are multiple-transferred through the first to fifth units, reaches a secondary transfer unit formed of the intermediate transfer belt 20, an opposing roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the opposing roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

The intermediate transfer belt 20 after the toner image is transferred to the recording paper P continuously travels and comes into contact with the cleaning blade of the intermediate transfer member cleaning device 21. The toner remaining on the intermediate transfer belt 20 is removed by the intermediate transfer member cleaning device 21 and recovered.

The recording paper P to which the toner image has been transferred is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

The aspect of image formation by the image forming device shown in FIG. 1 is not limited to the description above. Examples of the aspect of image formation include an aspect in which a white image is formed on one surface of the recording paper P by operating only the fifth unit 10W, the recording paper P is sent upstream in the traveling direction of the intermediate transfer belt, and a color image is formed on the white image of the recording paper P by operating the first unit 10Y to the fourth unit 10K, an aspect in which a white image is formed on one surface of the recording paper P by operating only the fifth unit 10W, the recording paper P is sent upstream in the traveling direction of the intermediate transfer belt, and a white image and a color image are formed on the white image of the recording paper P by operating the first unit 10Y to the fifth unit 10W, and an aspect in which a white image is formed on one surface of the recording paper P by operating only the fifth unit 10W, the recording paper P is sent upstream in the traveling direction of the intermediate transfer belt, a white image is superimposed on the white image of the recording paper P by operating only the fifth unit 10W again, the recording paper P is returned upstream in the traveling direction of the intermediate transfer belt, and a color image is formed on multilayers of the white images of the recording paper P by operating the first unit 10Y to the fourth unit 10K.

Process Cartridge and Toner Cartridge

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachably attached to the image forming device.

The configuration of the process cartridge according to the present exemplary embodiment is not limited to the above-described configuration, and a configuration including a developing unit and, as necessary, at least one selected from other units such as an image holding member, a charging unit, an electrostatic charge image forming unit, and a transfer unit may be employed.

Hereinafter, an example of the process cartridge according to the present exemplary embodiment will be described, but the present invention is not limited thereto. In the description below, main parts shown in the figures will be described, but description of other parts will not be provided.

Figure 2:
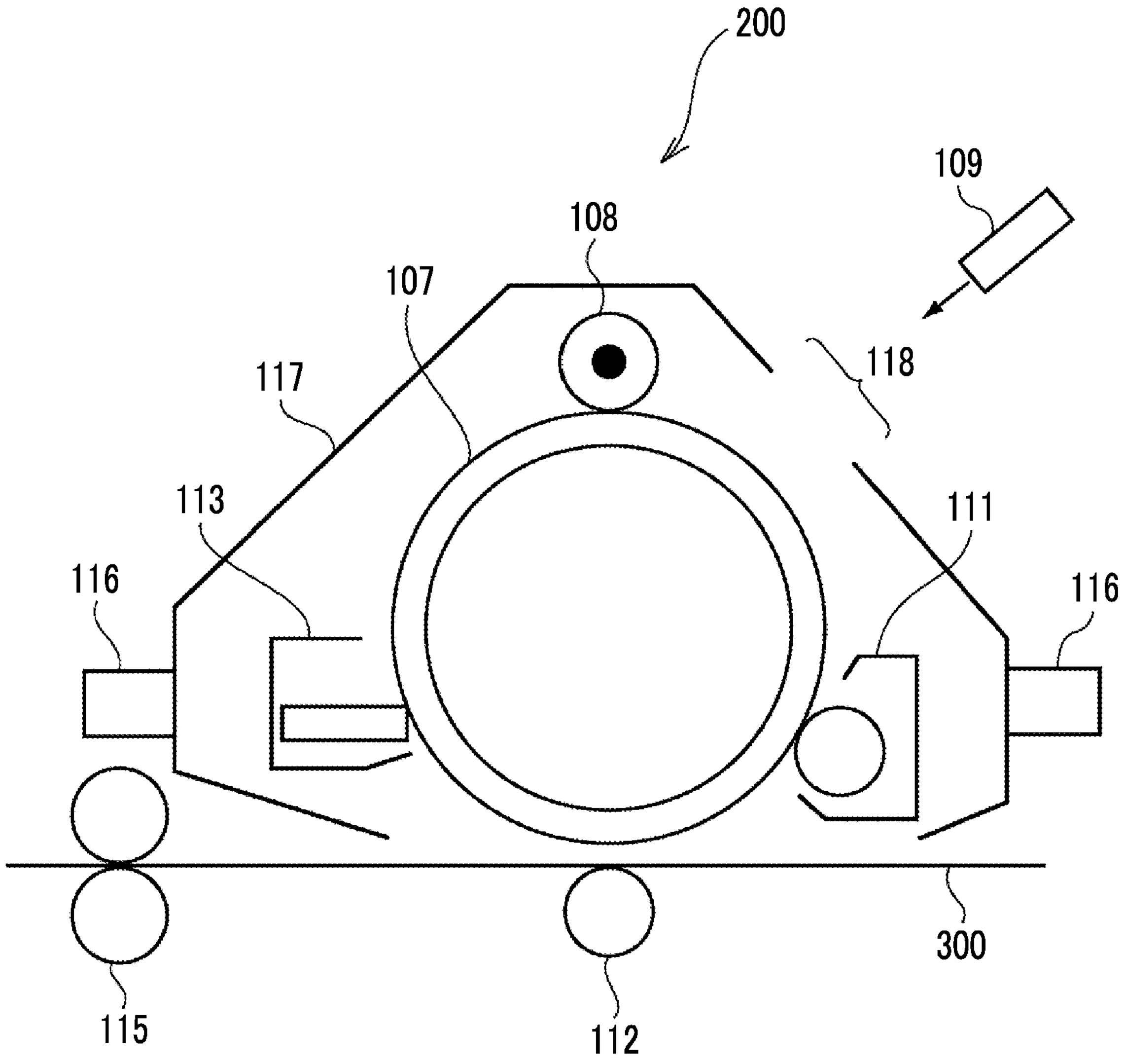
FIG. 2 is a schematic configuration view showing an example of a process cartridge detachably attached to the image forming device according to the present exemplary embodiment.

FIG. 2 is a schematic configuration view showing the process cartridge according to the present exemplary embodiment.

A process cartridge 200 shown in FIG. 2 is, for example, configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the image holding member cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

The toner cartridge according to the present exemplary embodiment will be described below.

The toner cartridge according to the present exemplary embodiment is a toner cartridge that includes a container accommodating the white toner according to the present exemplary embodiment and is detachable from the image forming device. The toner cartridge includes a container accommodating a toner for replenishment which is to be supplied to the developing unit provided in the image forming device.

The image forming device shown in FIG. 1 is an image forming device having a configuration in which the toner cartridges 8Y, 8M, 8C, 8K, and 8W are detachable, and the developing devices 4Y, 4M, 4C, 4K, and 4W are respectively connected to the toner cartridge corresponding to each color through a toner supply tube (not shown). Further, in a case where the amount of toner accommodated in the container of the toner cartridge is decreased, the toner cartridge is replaced. An example of the toner cartridge according to the present exemplary embodiment is the toner cartridge 8W, which contains the white toner according to the present exemplary embodiment. The toner cartridges 8Y, 8M, 8C, and 8K respectively contain a yellow toner, a magenta toner, a cyan toner, and a black toner.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

Unless otherwise specified, synthesis, treatments, production, and the like are carried out at room temperature (25° C.±3° C.)

Preparation of Surface-Treated Titanium Oxide White Pigment (1)

Titanium tetrachloride is subjected to gas-phase oxidation using oxygen gas, a vaporization effluent containing titanium oxide is allowed to flow into a mixed gas in which vapor metal ions of aluminum and oxygen are mixed at a ratio of 60:40, and the temperature is held at 1600° C. for 30 minutes so that the surface of the titanium oxide is coated with alumina, thereby obtaining surface-treated titanium oxide. The surface-treated titanium oxide is defined as a white pigment (1). The atomic composition of the surface of the white pigment (1) is 14.3 atomic % of Al, 8.2 atomic % of Ti, and an atomic weight ratio Al/Ti of 1.7.

White pigments (2) to (8)

Each surface-treated titanium oxide is obtained in the same manner as in the preparation of the white pigment (1) except that the size of titanium oxide prepared by a phase method and the holding time after the vaporized effluent containing titanium oxide flows into the mixed gas are increased or decreased. The surface-treated titanium oxides are defined as white pigments (2) to (8).

White Pigment (9)

A white pigment (9) is obtained in the same manner as in the preparation of the white pigment (1) except that untreated titanium oxide is obtained without mixing vapor metal ions of aluminum, and the untreated titanium oxide is defined as the white pigment (9).

Preparation of White Pigment Dispersion Liquids (1) to (9)

100 parts of the white pigment, 5 parts of an anionic surfactant (NEOGEN RK, manufactured by DKS Co., Ltd.), and 90 parts of ion exchange water are mixed and dispersed using a homogenizer (ULTRA-TURRAX T50, manufactured by IKA) for 30 minutes. Ion exchange water is added to the mixture to adjust the solid content to 50%. White pigment dispersion liquids (1) to (9) are respectively obtained from the white pigments (1) to (9).

Preparation of Hybrid Resin

Hybrid Resin (1)

Formation of Crystalline Polyester Resin Unit 260 parts of 1,6-hexanediol, 460 parts of 1,10-decanedicarboxylic acid, and 2 parts of tin octylate serving as a polymerization catalyst are added to a reaction container equipped with a stirrer, a thermometer, a nitrogen introduction tube, and a decompression device, the mixture is heated to 180° C. and allowed to react for 10 hours while water generated in a nitrogen gas stream at the identical temperature is distilled off. Thereafter, the temperature inside the reaction container is gradually raised to 230° C., and the mixture is allowed to react for 5 hours while water is distilled off in a nitrogen atmosphere. Next, the mixture is allowed to react while water is distilled off under a reduced pressure of 0.007 MPa or greater and 0.026 MPa or less, and the reaction is stopped when the acid value reaches 0.1 mgKOH/g, thereby obtaining a crystalline polyester resin unit.

Formation of Amorphous Resin Unit

A mixture of 140 parts of hexamethylene diisocyanate, 40 parts of acrylic acid, 170 parts of styrene, 50 parts of butyl acrylate, and 50 parts of di-t-butyl peroxide serving as a polymerization initiator is put into a dripping funnel. Next, the dripping funnel is placed in the above-described reaction container (accommodating 160 parts of the crystalline polyester resin unit), and the mixture is added dropwise thereto from the dripping funnel over 1 hour while the inside of the reaction container is stirred at 160° C. After the dropwise addition, the reaction is continued for 1 hour while the inside of the reaction container is maintained at 160° C. Thereafter, the inside of the reaction container is heated to 200° C. and maintained at 10 kPa for 1 hour, and the remaining monomer is removed. In this manner, a hybrid resin (1) in which the amorphous resin unit of the polyurethane resin and the polystyrene resin and the crystalline polyester resin unit are chemically bonded to each other is obtained.

Hybrid Resins (2) to (5)

Hybrid resins (2) to (5) are synthesized in the same manner as in the preparation of the hybrid resin (1) except that the composition of the monomer and the amount of the crystalline polyester resin unit used are changed as listed in Table 1.

TABLE 1

| Hybrid resin | | | Amount of monomer used [parts by mass] (1) | (2) | (3) | (4) | (5) |
|---|---|---|---|---|---|---|---|
| Crystalline PE resin unit | Polyhydric alcohol | 1,6-Hexanediol | 260 | 260 | — | 140 | 260 |
| | | 1,9-Nonanediol | — | — | 353 | — | — |
| | | 1,12-Dodecanediol | — | — | — | 200 | — |
| | Polyvalent carboxylic acid | 1,10-Decanedicarboxylic acid | 460 | — | 230 | 230 | 460 |
| | | 1,12-Dodecanedicarboxylic acid | — | — | 258 | — | — |
| | | Fumaric acid | — | 232 | — | 116 | — |
| | Amount used for bonding reaction with respect to amorphous resin unit | | 160 | 180 | 130 | 200 | 100 |
| Amorphous resin unit | Urethane monomer | Hexamethylene diisocyanate | 140 | 140 | 140 | 140 | 140 |
| | Both-reactive monomer | Acrylic acid | 40 | 40 | 40 | 40 | 40 |
| | Vinyl-based monomer | Styrene | 170 | 170 | 170 | 170 | — |
| | | Butyl acrylate | 50 | 50 | 50 | 50 | 50 |
| | | Ethylene | — | — | — | — | 90 |

Preparation of Hybrid Resin Particle Dispersion Liquids (1) to (5)

The hybrid resin is dispersed using a disperser obtained by modifying CAVITRON CD1010 (manufactured by Eurotec Ltd.) into a high-temperature and high-pressure type disperser. 20 parts of the hybrid resin and 80 parts of ion exchange water are mixed, ammonia is added thereto to adjust the pH to 8.5, and CAVITRON is operated under conditions of a rotator rotation speed of 60 Hz, a pressure of 5 kg/cm$^2$, and a heating temperature of 140° C. using a heat exchanger. Ion exchange water is added to the dispersion liquid to adjust the solid content to 20%, and hybrid resin particle dispersion liquids (1) to (5) are respectively obtained from the hybrid resins (1) to (5). The volume average particle diameter of the resin particles in each of the hybrid resin particle dispersion liquids is 120 nm.

Preparation of Vinyl-Based Resin Particle Dispersion Liquid

Polystyrene Acrylic Resin Particle Dispersion Liquid (1)
Styrene: 77 parts
n-Butyl acrylate: 23 parts
1,10-decanediol diacrylate: 0.4 parts
Dodecanethiol: 0.7 parts The above-described materials are mixed and dissolved, and a solution obtained by dissolving 1 part of an anionic surfactant (Dowfax 2A1, manufactured by The Dow Chemical Company) in 60 parts of ion exchange water is added thereto and dispersed and emulsified in a flask, thereby preparing an emulsified liquid. 2 parts of the anionic surfactant (Dowfax 2A1, manufactured by The Dow Chemical Company) is dissolved in 90 parts of ion exchange water, 2 parts of the emulsified liquid is added thereto, and 10 parts of ion exchange water in which 1 part of ammonium persulfate is dissolved is added thereto. Further, the rest of the emulsified liquid is added thereto over 3 hours. The inside of the reaction container is substituted with nitrogen, and the solution is heated to 65° C. in an oil bath while being stirred and is allowed to continuously react for 5 hours. After the reaction, the solid content is adjusted to 30% by adding ion exchange water to the solution, thereby obtaining a polystyrene acrylic resin particle dispersion liquid (1). The volume average particle diameter of the resin particles in the polystyrene acrylic resin particle dispersion liquid (1) is 102 nm, and the weight-average-molecular weight (Mw) thereof is 57000.

Preparation of Release Agent Particle Dispersion Liquid (1)

270 parts of ester wax (melting temperature of 72° C., manufactured by Nippon Seiro Co., Ltd.), 15 parts of an anionic surfactant (NEOGEN RK, manufactured by DKS Co., Ltd.), and 20 parts of ion exchange water are mixed, and the release agent is dissolved at an internal liquid temperature of 120° C. with a pressure discharge type homogenizer (Gaulin homogenizer, manufactured by Gaulin). Next, the dispersion treatment is performed at a dispersion pressure of 5 MPa for 120 minutes, and continuously at 40 MPa for 360 minutes, and the solution is cooled. Ion exchange water is added thereto to adjust the solid content to 20%, thereby obtaining a release agent particle dispersion liquid (1). The volume average particle diameter of the particles in the release agent particle dispersion liquid is 220 nm.

Preparation of Toner and Developer

Example 1

First Aggregated Particle Formation Step
- Polystyrene acrylic resin particle dispersion liquid (1) (solid content of 30%): 40 parts
- Hybrid resin particle dispersion liquid (1) (solid content of 20%): 100 parts
- White pigment dispersion liquid (1) (solid content of 50%): 80 parts
- Release agent particle dispersion liquid (1) (solid content of 20%): 30 parts
- Ion exchange water: 200 parts
- Anionic surfactant (Dowfax2A1, manufactured by Dow Chemical Co., Ltd.): 2.0 parts The above-described materials are added to a reaction container equipped with a thermometer, a pH meter, and a stirrer, and 1.0% nitric acid is added thereto at a temperature of 25° C. to adjust the pH thereto to 3.0. Thereafter, while the mixture is dispersed at 5000 rpm with a homogenizer (ULTRA-TURRAX T50, manufactured by IKA), 100 parts of a magnesium chloride aqueous solution having a concentration of 2.0% is added thereto as an aggregating agent and dispersed for 6 minutes. Next, a stirrer and a mantle heater are installed in the reaction container, and while the rotation speed of the stirrer is adjusted such that the slurry is sufficiently stirred, the solution is heated at a temperature rising rate of 0.2° C./min up to a temperature of 40° C. and heated at a temperature rising rate of 0.05° C./min in a temperature range of higher than 40° C. and 53° C. or lower, and the particle diameter is measured every 10 minutes with Multisizer II (aperture diameter of 50 μm, manufactured by Beckman Coulter Inc.). The temperature is maintained when the volume average particle diameter reached 4.2 μm, and the resultant is defined as the first aggregated particle dispersion liquid.

Second Aggregated Particle Formation Step 40 parts of the polystyrene acrylic resin particle dispersion liquid (1) (solid content of 30%) is added to the first aggregated particle dispersion liquid over 5 minutes and maintained for 20 minutes, and the resultant is defined as the second aggregated particle dispersion liquid.

Fusion and Coalescence Step

The second aggregated particle dispersion liquid is maintained at 50° C. for 30 minutes, and 8 parts of a 20% aqueous solution of EDTA (ethylenediaminetetraacetic acid) is added to the reaction container. Next, a 1 mol/L sodium aqueous hydroxide aqueous solution is added thereto to adjust the pH of the dispersion liquid to 9.0. Next, while the pH thereof is adjusted to 9.0 at every 5° C., the solution is heated to 90° C. at a temperature rising rate of 1° C./min and maintained at 90° C. The shape of the particles is observed with an optical microscope, the coalescence of the particles is confirmed, and the reaction container is cooled to 30° C. with cooling water.

The cooled slurry is allowed to pass through a nylon mesh having a mesh opening of 15 μm to remove coarse powder, and the toner slurry that has passed through the mesh is vacuum-filtered with an aspirator. The solid content remaining on the filter paper is finely crushed by hand, added to ion exchange water in an amount of 10 times the solid content at a temperature of 30° C., and the solution is mixed by being stirred for 30 minutes. Next, the solution is vacuum-filtered with an aspirator, the solid content remaining on the filter paper is finely crushed by hand and added to ion exchange water in an amount of 10 times the solid content at a temperature of 30° C., and the solution is mixed by being stirred for 30 minutes and vacuum-filtered with an aspirator again, and the electrical conductivity of the filtrate is measured. The operation is repeatedly performed until the electrical conductivity of the filtrate reaches 10 μS/cm or less, and the solid content is washed. The washed solid content is finely crushed with a wet dry granulator (Comil) and vacuum-dried in an oven at 35° C. for 36 hours, thereby obtaining toner particles. The volume average particle diameter of the toner particles is 5.7 μm.

External Addition of Hydrophobic Silica Particles 1.5 parts of hydrophobic silica particles (RY50, manufactured by Nippon Aerosil Co., Ltd.) are added to 100 parts of the toner particles, and the mixture is mixed at 13000 rpm for 30 seconds using a sample mill. Thereafter, the mixture is sieved with a vibrating sieve having a mesh opening of 45 μm, thereby preparing an externally added toner.

Mixing with Carrier 10 parts of the externally added toner and 100 parts of the carrier are added a V-blender and stirred for 20 minutes. Thereafter, the developer is obtained by sieving the mixture with a sieve having a mesh opening of 212 μm. The carrier is prepared as follows.

Preparation of Carrier

Ferrite particles (volume average particle diameter of 35 μm): 100 parts

Toluene: 14 parts

Styrene/methyl methacrylate copolymer (copolymerization ratio of 15/85): 3 parts Carbon black (Rega1330, Cabot Corporation): 0.2 parts The above-described materials excluding ferrite particles are dispersed in a sand mill to prepare a dispersion liquid. The dispersion liquid and ferrite particles are added to a vacuum degassing type kneader, the mixture is decompressed while being stirred and is dried, thereby obtaining a resin-coated carrier.

Examples 2 to 17 and Comparative Examples 1 to 6

Toner particles, externally added toners, and developers of the examples are prepared in the same manner as in Example 1 except that the kind and the use amount of the hybrid resin particle dispersion liquid and the kind and the use amount of the white pigment dispersion liquid are changed so as to have the specification listed in Table 2.

Evaluation of Performance

Toner Slip-Through (Wear of Cleaning Blade of Intermediate Transfer Member)

A commercially available image forming device (DocuCentre III C7600, manufactured by Fuji Xerox Co., Ltd.) for an electrophotographic method and an intermediate transfer method is prepared, and a developing device is filled with the developer.

In an environment of a temperature of 28° C. and a relative humidity of 85%, 5000 sheets of white images having an image density of 20% are output on plain paper (P paper A4, manufactured by Fuji Xerox Co., Ltd.), and one sheet of a white image having a density of 50% is output. Pressure-sensitive adhesive tape is attached to the surface of the intermediate transfer belt after image formation and peeled off, and the peeled pressure-sensitive adhesive tape is attached to black paper. The white toner under the pressure-sensitive adhesive tape is visually observed and classified as follows. The results are listed in Table 2.

A: The white toner has not been confirmed.

B: A trace amount of the white toner has been confirmed, but it is within a practically acceptable range.

C: A small amount of the white toner has been confirmed, but it is within a practically acceptable range.

D: The white toner has been confirmed over the entire pressure-sensitive adhesive tape, which is not appropriate for practical use.

Whiteness

A commercially available image forming device (DocuCentre III C7600, manufactured by Fuji Xerox Co., Ltd.) for an electrophotographic method and an intermediate transfer method is prepared, and a developing device is filled with the developer.

A white image with an image density of 100% is formed on black paper. The image is visually observed under natural light in a room and classified as follows. The results are listed in Table 2.

A: The white color is bright and satisfactory.

B: The white color is sufficiently white.

C: The white color appears to be slightly dull.

D: The black background is slightly recognized.

E: The black background is clearly recognized, which is unacceptable.

TABLE 2

| | Hybrid resin particle dispersion liquid and hybrid resin | | White pigment dispersion liquid and white pigment | | | | | |
|---|---|---|---|---|---|---|---|---|
| | | Proportion of amorphous resin unit in terms | | Atomic composition of surface | | | Average major axis | BET specific surface |
| | Type — | of mass % by mass | Type — | Al atomic % | Ti atomic % | Al/Ti — | length nm | area $m^2/g$ |
| Comparative example 1 | — | — | (1) | 14.3 | 8.2 | 1.7 | 40 | 9 |
| Comparative example 2 | (1) | 72 | (5) | 23.4 | 10.1 | 2.3 | 103 | 8 |
| Comparative example 3 | (1) | 72 | (6) | 2.5 | 7.9 | 0.3 | 21 | 12 |
| Comparative example 4 | (1) | 72 | (7) | 15.3 | 16.4 | 0.9 | 124 | 7 |
| Comparative example 5 | (1) | 72 | (8) | 12.8 | 4.8 | 2.7 | 38 | 10 |
| Comparative example 6 | (1) | 72 | (9) | 0 | 14.7 | 0 | 52 | 8 |
| Example 1 | (1) | 72 | (1) | 14.3 | 8.2 | 1.7 | 40 | 9 |
| Example 2 | (1) | 72 | (2) | 3.2 | 5.3 | 0.6 | 29 | 11 |
| Example 3 | (1) | 72 | (3) | 19.8 | 7.4 | 2.7 | 85 | 7 |
| Example 4 | (1) | 72 | (4) | 13.5 | 14.8 | 0.9 | 162 | 5 |
| Example 5 | (2) | 54 | (1) | 14.3 | 8.2 | 1.7 | 40 | 9 |
| Example 6 | (3) | 88 | (1) | 14.3 | 8.2 | 1.7 | 40 | 9 |
| Example 7 | (4) | 42 | (1) | 14.3 | 8.2 | 1.7 | 40 | 9 |
| Example 8 | (5) | 96 | (1) | 14.3 | 8.2 | 1.7 | 40 | 9 |
| Example 9 | (1) | 72 | (1) | 14.3 | 8.2 | 1.7 | 40 | 9 |
| Example 10 | (1) | 72 | (1) | 14.3 | 8.2 | 1.7 | 40 | 9 |
| Example 11 | (1) | 72 | (1) | 14.3 | 8.2 | 1.7 | 40 | 9 |
| Example 12 | (1) | 72 | (1) | 14.3 | 8.2 | 1.7 | 40 | 9 |
| Example 13 | (1) | 72 | (1) | 14.3 | 8.2 | 1.7 | 40 | 9 |
| Example 14 | (1) | 72 | (1) | 14.3 | 8.2 | 1.7 | 40 | 9 |
| Example 15 | (1) | 72 | (1) | 14.3 | 8.2 | 1.7 | 40 | 9 |
| Example 16 | (1) | 72 | (1) | 14.3 | 8.2 | 1.7 | 40 | 9 |
| Example 17 | (1) | 72 | (1) | 14.3 | 8.2 | 1.7 | 40 | 9 |

| | Toner particles | | | Proportion of amorphous resin | Evaluation of performance | |
|---|---|---|---|---|---|---|
| | Proportion of hybrid resin | Proportion of white pigment | | unit in hybrid resin in terms of | | |
| | in toner particles in terms of mass % by mass | in toner particles in terms of mass % by mass | Hybrid resin/white pigment — | mass/proportion of Al atoms in surface of white pigment % by mass/atomic % | Toner slip-through — | Whiteness — |
| Comparative example 1 | 0 | 40 | 0 | 0 | D | B |
| Comparative example 2 | 44 | 40 | 1.1 | 3.1 | D | B |
| Comparative example 3 | 44 | 40 | 1.1 | 29 | D | C |
| Comparative example 4 | 44 | 40 | 1.1 | 4.7 | D | A |
| Comparative example 5 | 44 | 40 | 1.1 | 5.6 | B | E |
| Comparative example 6 | 44 | 40 | 1.1 | — | D | B |
| Example 1 | 44 | 40 | 1.1 | 5 | A | A |
| Example 2 | 44 | 40 | 1.1 | 22.5 | C | D |
| Example 3 | 44 | 40 | 1.1 | 3.6 | C | B |
| Example 4 | 44 | 40 | 1.1 | 5.3 | B | B |
| Example 5 | 44 | 40 | 1.1 | 3.8 | B | A |
| Example 6 | 44 | 40 | 1.1 | 6.2 | B | B |
| Example 7 | 44 | 40 | 1.1 | 2.9 | C | B |
| Example 8 | 44 | 40 | 1.1 | 6.7 | A | B |
| Example 9 | 6 | 39 | 0.15 | 5 | B | B |
| Example 10 | 3 | 41 | 0.07 | 5 | C | B |
| Example 11 | 58 | 40 | 1.5 | 5 | B | A |
| Example 12 | 67 | 41 | 1.6 | 5 | A | B |
| Example 13 | 43 | 22 | 2 | 5 | B | B |
| Example 14 | 47 | 18 | 2.6 | 5 | A | C |
| Example 15 | 44 | 57 | 0.77 | 5 | B | B |

TABLE 2-continued

| | | | | | | |
|---|---|---|---|---|---|---|
| Example 16 | 46 | 61 | 0.75 | 5 | C | A |
| Example 17 | 57 | 16 | 3.6 | 5 | A | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A white toner comprising:

a toner particle that contains a binder resin containing a hybrid resin in which an amorphous resin unit and a crystalline polyester resin unit are chemically bonded to each other, surface-treated titanium oxide, and a release agent, wherein a proportion of Al atoms in a surface of the surface-treated titanium oxide is 3 atomic % or greater and 20 atomic % or less, and a proportion of Ti atoms in the surface is 5 atomic % or greater and 15 atomic % or less, wherein a ratio (Al/Ti) of an atomic weight of Al to an atomic weight of Ti in the surface of the surface-treated titanium oxide is 1.5 or greater and 4.0 or less.

2. The white toner according to claim 1, wherein the proportion of Al atoms in the surface of the surface-treated titanium oxide is 5 atomic % or greater and 15 atomic % or less, and the proportion of Ti atoms in the surface is 6 atomic % or greater and 12 atomic % or less.

3. The white toner according to claim 1, wherein a ratio (Al/Ti) of an atomic weight of Al to an atomic weight of Ti in the surface of the surface-treated titanium oxide is 1.5 or greater and 3.5 or less.

4. The white toner according to claim 1, wherein a proportion of the amorphous resin unit in the hybrid resin in terms of mass is 50% by mass or greater and 90% by mass or less.

5. The white toner according to claim 1, wherein a proportion of the amorphous resin unit in the hybrid resin in terms of mass is 60% by mass or greater and 85% by mass or less.

6. The white toner according to claim 1, wherein a mass ratio (hybrid resin/surface-treated titanium oxide) of the hybrid resin to the surface-treated titanium oxide contained in the toner particle is 0.08 or greater and 3.0 or less.

7. The white toner according to claim 1, wherein a ratio (proportion of amorphous resin unit in terms of mass/proportion of Al atoms) of a proportion (% by mass) of the amorphous resin unit in the hybrid resin in terms of mass to the proportion (atomic %) of Al atoms in the surface of the surface-treated titanium oxide is 2.5 or greater and 3.0 or less.

8. The white toner according to claim 1, wherein a content of the hybrid resin contained in the toner particle is 5% by mass or greater and 60% by mass or less with respect to an entirety of the toner particle.

9. The white toner according to claim 1, wherein the surface-treated titanium oxide has an average major axis length of 20 nm or greater and 300 nm or less.

10. The white toner according to claim 1, wherein the surface-treated titanium oxide has a BET specific surface area of 4 $m^2/g$ or greater and 12 $m^2/g$ or less.

11. The white toner according to claim 1, wherein a content of the surface-treated titanium oxide contained in the toner particles is 20% by mass or greater and 60% by mass or less with respect to an entirety of the toner particle.

12. An electrostatic charge image developer comprising:

the white toner according to claim 1.

13. A toner cartridge comprising:

a container that accommodates the white toner according to claim 1, wherein the toner cartridge is detachable from an image forming device.

* * * * *